United States Patent
Zhao et al.

(10) Patent No.: US 11,757,534 B1
(45) Date of Patent: Sep. 12, 2023

(54) SELF-COHERENT RECEIVER BASED ON SINGLE DELAY INTERFEROMETER

(71) Applicant: BEIJING ZHONGKE GUOGUANG QUANTUM TECHNOLOGY CO., LTD., Beijing (CN)

(72) Inventors: Yibo Zhao, Beijing (CN); Dong Wang, Beijing (CN); Dongsheng Chen, Beijing (CN)

(73) Assignee: BEIJING ZHONGKE GUOGUANG QUANTUM TECH. CO., LTD., Beijing (CN)

( * ) Notice: Subject to any disclaimer, the term of this patent is extended or adjusted under 35 U.S.C. 154(b) by 0 days.

(21) Appl. No.: 18/198,315

(22) Filed: May 17, 2023

(30) Foreign Application Priority Data

Sep. 14, 2022 (CN) .......................... 202211113284.6

(51) Int. Cl.
*H04B 10/00* (2013.01)
*H04B 10/61* (2013.01)
*H04J 14/00* (2006.01)

(52) U.S. Cl.
CPC ..... *H04B 10/6151* (2013.01); *H04B 10/6162* (2013.01)

(58) Field of Classification Search
CPC ....... H04B 10/60; H04B 10/61; H04B 10/615
See application file for complete search history.

(56) References Cited

U.S. PATENT DOCUMENTS

2012/0093457 A1\* 4/2012 Sakamaki .............. H04B 10/65
385/14

\* cited by examiner

*Primary Examiner* — Daniel G Dobson
(74) *Attorney, Agent, or Firm* — COOPER LEGAL GROUP, LLC

(57) ABSTRACT

Disclosed is a self-coherent receiver based on single delay interferometer, comprising a first beam splitter, a first circulator, a second circulator, a double path bidirectional multiplexing delay interferometer, a first balanced detector, a second balanced detector and an electrical signal processing module.

9 Claims, 3 Drawing Sheets

SELF-COHERENT RECEIVER BASED ON SINGLE DELAY INTERFEROMETER

CROSS-REFERENCE TO RELATED APPLICATION

This application claims the priority and benefit of Chinese patent application serial no. 202211113284.6, filed on Sep. 14, 2022. The entirety of Chinese patent application serial no. 202211113284.6 is hereby incorporated by reference herein and made a part of this specification.

TECHNICAL FIELD

This application relates to a technical field of optical communication, and, in particular, to a self-coherent receiver based on a single delay interferometer.

BACKGROUND

Differential Quadrature Reference Phase Shift Keying (DQPSK) modulation has a higher tolerance to noise, nonlinear effects and coherent crosstalk, and thus is very suitable for optical communication systems with high transmission rates and high anti-interference. Conventional DQPSK demodulation requires two sets of DPSK demodulators, such as two delay interferometers, to complete the demodulation of I component and Q component, which results in a larger size, higher cost and complexity for a receiver.

In the prior art, there are several solutions for the above problems. One solution only involves one delay interferometer. In this solution, as to the polarization state of the optical signal entering the interferometer, the optical signal after entering the interferometer should be 45° linearly polarized. However, since the polarization of the optical signal will become random after being transmitted to the receiving terminal through the fiber channel, a real-time calibration of polarization is required by this solution. In addition, a delay interferometer is used in the related technique to realize polarization-independent demodulation of I component and Q component, to solve the problem about polarization. However, 4 sets of balanced detectors are required, which increases difficulty and complexity of processing such as subsequent amplification of electrical signals, resulting in an increase in the cost of the system.

SUMMARY

In view of the above defects, a self-coherent receiver based on single delay interferometer is proposed.

A self-coherent receiver based on single delay interferometer according to the present application includes a first beam splitter, a first circulator, a second circulator, a double path bidirectional multiplexing delay interferometer, a first balanced detector, a second balanced detector and an electrical signal processing module;

two output ports of the first beam splitter are respectively connected to a first port of the first circulator and a first port of the second circulator; a second port of the first circulator and a second port of the second circulator are respectively connected to two input ports of the double path bidirectional multiplexing delay interferometer; two output ports of the double path bidirectional multiplexing delay interferometer are respectively connected to one photoelectric detector of the first balanced detector and one photoelectric detector of the second balanced detector; a third port of the first circulator and a third port of the second circulator are respectively connected to the other photoelectric detector of the first balanced detector and the other photoelectric detector of the second balanced detector; a differential current output port of the first balanced detector and a differential current output port of the second balanced detector are respectively connected to the electrical signal processing module;

the first beam splitter is configured to split a received signal light, to generate a first signal light component and a second signal light component;

the first circulator is configured to transmit the first signal light component to one of the input ports of the double path bidirectional multiplexing delay interferometer; the second circulator is configured to transmit the second signal light component to the other of the input ports of the double path bidirectional multiplexing delay interferometer;

the double path bidirectional multiplexing delay interferometer has a long arm and a short arm, to perform a polarization-independent delayed self-interference on the first signal light component, so as to generate a first interference optical signal and a second interference optical signal, the first interference optical signal and the second interference optical signal are respectively output from one of the input ports and one of the output ports of the double path bidirectional multiplexing delay interferometer; and to perform a polarization-independent delayed self-interference on the second signal light component, so as to generate a third interference optical signal and a fourth interference optical signal, the third interference optical signal and the fourth interference optical signal are respectively output from the other of the input ports and the other of the output ports of the double path bidirectional multiplexing delay interferometer;

a phase difference between components of the first signal light component on the long arm and the short arm of the double path bidirectional multiplexing delay interferometer is 0, and a phase difference between components of the second signal light component on the long arm and the short arm of the double path bidirectional multiplexing delay interferometer is $\pi/2$;

the first circulator is also configured to transmit the first interference optical signal to the first balanced detector; the second circulator is also configured to transmit the third interference optical signal to the second balanced detector;

the first balanced detector is configured for balanced detection on the first interference optical signal and the second interference optical signal, to generate a first differential current signal; the second balanced detector is configured for balanced detection on the third interference optical signal and the fourth interference optical signal, to generate a second differential current signal;

the electrical signal processing module is configured to receive the first differential current signal and the second differential current signal, further process them after sampling, to restore service data.

Preferably, the double path bidirectional multiplexing delay interferometer includes a first polarization beam splitter, a second polarization beam splitter and a delay interference apparatus;

one input port of the first polarization beam splitter is connected to the second port of the first circulator, and the other input port is configured as one of the output ports of the double path bidirectional multiplexing delay interferometer;

two output ports of the first polarization beam splitter are respectively connected to one input port and one output port of the delay interference apparatus through polarization-maintaining optical fibers;

one input port of the second polarization beam splitter is connected to the second port of the second circulator, while the other input port of the second polarization beam splitter is configured as the other of the output ports of the double path bidirectional multiplexing delay interferometer;

two output ports of the second polarization beam splitter are respectively connected to the other input port and the other output port of the delay interference apparatus through polarization-maintaining optical fibers.

Preferably, the double path bidirectional multiplexing delay interferometer includes a third polarization beam splitter, a fourth polarization beam splitter and a delay interference apparatus;

two input ports of the third polarization beam splitter are respectively connected to the second port of the first circulator and the second port of the second circulator through polarization-maintaining optical fibers, while two output ports of the third polarization beam splitter are respectively connected to one input port and one output port of the delay interference apparatus;

two input ports of the fourth polarization beam splitter are respectively connected to the other input port and the other output port of the delay interference apparatus through polarization-maintaining optical fibers, while two output ports of the fourth polarization beam splitter are respectively configured as the two output ports of the double path bidirectional multiplexing delay interferometer.

Preferably, the delay interference apparatus includes a second beam splitter, a third beam splitter, a first delay line and a first quarter-wave plate;

an interior of the delay interference apparatus is filled only with polarization-maintaining optical fibers;

an angle between a main axis of the first quarter-wave plate and slow axis of the polarization-maintaining optical fibers is 0°;

one output port of the second beam splitter is connected to one output port of the third beam splitter through the first delay line to constitute a long arm of the delay interference apparatus; the other output port of the second beam splitter is connected to the other output port of the third beam splitter through the first quarter-wave plate to constitute a short arm of the delay interference apparatus;

two input ports of the second beam splitter are configured as two input ports of the delay interference apparatus respectively;

two input ports of the third beam splitter are configured as two output ports of the delay interference apparatus respectively.

Preferably, the delay interference apparatus includes a first 45° polarization rotation structure, a second 45° polarization rotation structure, a third 45° polarization rotation structure, a fourth 45° polarization rotation structure, a fifth polarization beam splitter, a sixth polarization beam splitter, a second delay line and a second quarter-wave plate;

an interior of the delay interference apparatus is filled only with polarization-maintaining optical fibers;

an angle between a main axis of the second quarter-wave plate and slow axis of the polarization-maintaining optical fibers is 0°;

one output port of the fifth polarization beam splitter is connected to one output port of the sixth polarization beam splitter through the second delay line to constitute a long arm of the delay interference apparatus; the other output port of the fifth polarization beam splitter is connected to the other output port of the sixth polarization beam splitter through the second quarter-wave plate to constitute a short arm of the delay interference apparatus;

two input ports of the fifth polarization beam splitter are configured as two input ports of the delay interference apparatus respectively.

two input ports of the sixth polarization beam splitter are configured as two output ports of the delay interference apparatus respectively;

the first 45° polarization rotation structure, the second 45° polarization rotation structure, the third 45° polarization rotation structure, the fourth 45° polarization rotation structure are correspondingly provided on optical fibers at the two input ports and the two output ports of the delay interference apparatus.

Preferably, the delay interference apparatus includes a first 45° polarization rotation structure, a second 45° polarization rotation structure, a third 45° polarization rotation structure, a fourth 45° polarization rotation structure, a fifth polarization beam splitter, a sixth polarization beam splitter, a second delay line, a second quarter-wave plate, a seventh polarization beam splitter and an eighth polarization beam splitter;

an interior of the delay interference apparatus is filled only with polarization-maintaining optical fibers;

an angle between a main axis of the second quarter-wave plate and slow axis of the polarization-maintaining optical fibers is 0°;

one output port of the fifth polarization beam splitter is connected to one output port of the sixth polarization beam splitter through the second delay line to constitute a long arm of the delay interference apparatus; the other output port of the fifth polarization beam splitter is connected to the other output port of the sixth polarization beam splitter through the second quarter-wave plate to constitute a short arm of the delay interference apparatus;

two output ports of the seventh polarization beam splitter are respectively connected to two input ports of the fifth polarization beam splitter through the first 45° polarization rotation structure and the second 45° polarization rotation structure;

two output ports of the eighth polarization beam splitter are respectively connected to two input ports of the sixth polarization beam splitter through the third 45° polarization rotation structure and the fourth 45° polarization rotation structure;

two input ports of the seventh polarization beam splitter are respectively configured as the two input ports of the delay interference apparatus;

two input ports of the eighth polarization beam splitter are respectively configured as the two output ports of the delay interference apparatus.

Preferably, the first 45° polarization rotation structure, the second 45° polarization rotation structure, the third 45° polarization rotation structure, and the fourth 45° polarization rotation structure are all half-wave plates, and an angle between a main axis direction of the half-wave plates and the horizontal direction is 22.5°.

The technical solution can bring beneficial effects as following.

A self-coherent receiver based on single delay interferometer according to the present application can realize delayed self-coherence independent of the signal light polarization without using a polarization controller to actively calibrate the signal light polarization, thereby eliminating influence of the random polarization state change of the signal light on the receiver, which improves the stability of the receiver. Moreover, the receiver only requires a single delay interferometer and two sets of balanced detectors, which reduces the difficulty and complexity of electronic signal processing after balanced detection, thus greatly reducing the complexity of the receiving terminal. At the same time, the present disclosure can be applied not only to optical communication systems, but also to continuous variable quantum key distribution systems and sensor systems, thereby having high versatility and practicability.

DESCRIPTION OF THE EMBODIMENTS

The present disclosure will be clearly and completely described below in combination with the drawings of the embodiments of the present disclosure.

Figure 1:
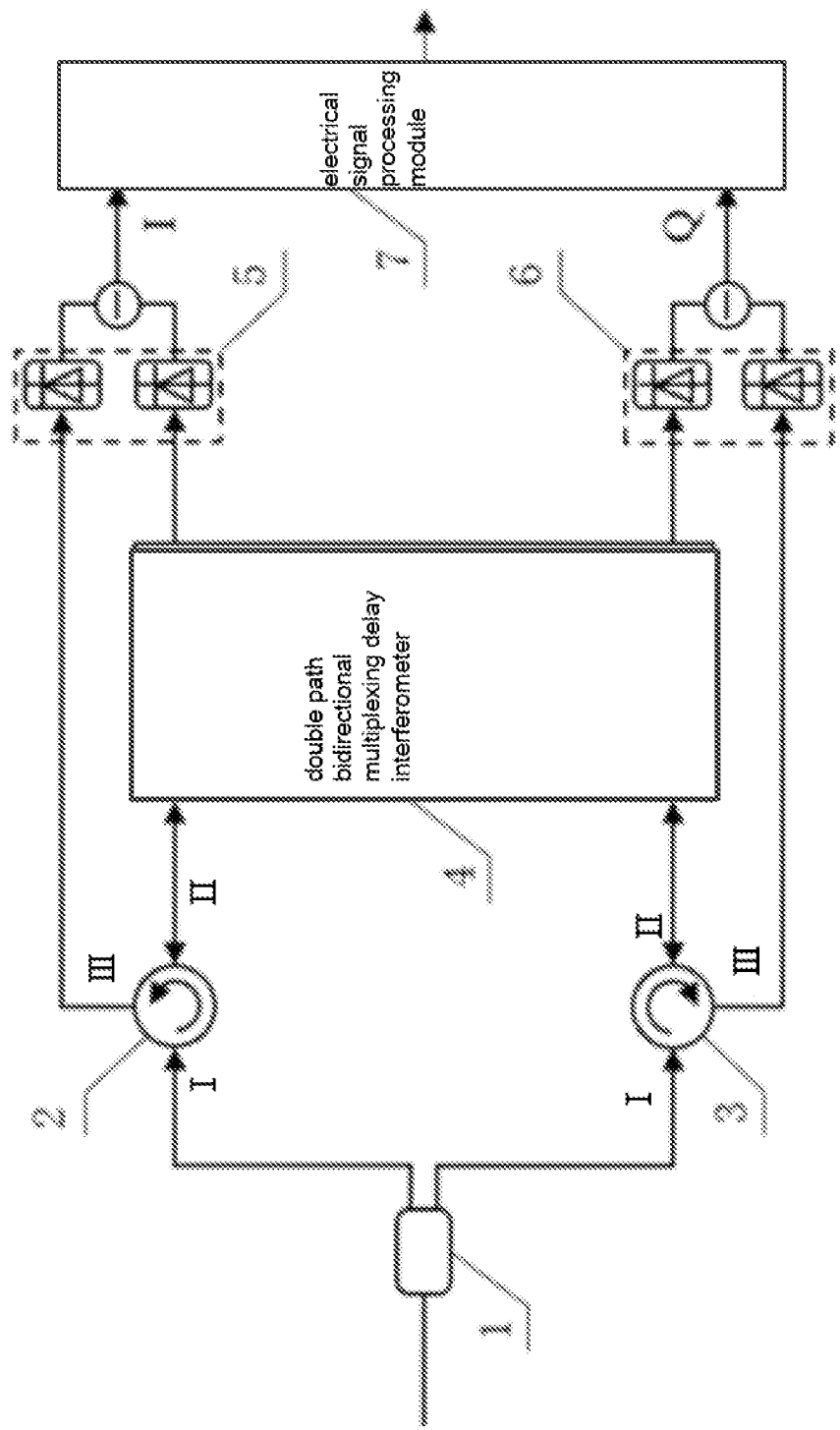
FIG. 1 is a structure schematic block diagram of the self-coherent receiver based on single delay interferometer according to the present disclosure.

As shown in FIG. 1, a self-coherent receiver based on single delay interferometer includes a first beam splitter 1, a first circulator 2, a second circulator 3, a double path bidirectional multiplexing delay interferometer 4, a first balanced detector 5, a second balanced detector 6 and an electrical signal processing module 7, wherein the first beam splitter 1, the first circulator 2, the second circulator 3, and the double path bidirectional multiplexing delay interferometer 4 constitute the optical part of the present disclosure, while the first balanced detector 5, the second balanced detector 6 and the electrical signal processing module 7 constitute the signal post-processing part.

Two output ports of the first beam splitter 1 are respectively connected to the first port of the first circulator 2 and the first port of the second circulator 3. The second port of the first circulator 2 and the second port of the second circulator 3 are respectively connected to two input ports of the double path bidirectional multiplexing delay interferometer 4. Two output ports of the double path bidirectional multiplexing delay interferometer 4 are respectively connected to one photoelectric detector of the first balanced detector 5 and one photoelectric detector of the second balanced detector 6. The third port of the first circulator 2 and the third port of the second circulator 3 are respectively connected to the other photoelectric detector of the first balanced detector 5 and the other photoelectric detector of the second balanced detector 6. The differential current output port of the first balanced detector 5 and the differential current output port of the second balanced detector 6 are respectively connected to the electrical signal processing module 7.

The first beam splitter 1 is configured to split the received signal light, to generate a first signal light component and a second signal light component.

The first circulator 2 is configured to transmit the first signal light component to one input port of the double path bidirectional multiplexing delay interferometer 4. The second circulator 3 is configured to transmit the second signal light component to the other input port of the double path bidirectional multiplexing delay interferometer 4.

The double path bidirectional multiplexing delay interferometer 4 has a long arm and a short arm, to perform a polarization-independent delayed self-interference on the first signal light component, so as to generate a first interference optical signal and a second interference optical signal, which are respectively output from one input port and one output port thereof; and to perform a polarization-independent delayed self-interference on the second signal light component, so as to generate a third interference optical signal and a fourth interference optical signal, which are respectively output from the other input port and the other output port thereof.

The phase difference between components of the first signal light component on the long arm and the short arm of the double path bidirectional multiplexing delay interferometer 4 is 0, and the phase difference between components of the second signal light component on the long arm and the short arm of the double path bidirectional multiplexing delay interferometer is $\pi/2$.

The first circulator 2 is also configured to transmit the first interference optical signal to the first balanced detector 5. The second circulator 3 is also configured to transmit the third interference optical signal to the second balanced detector 6.

The first balanced detector 5 is configured for balanced detection on the first interference optical signal and the second interference optical signal, to generate a first differential current signal. The second balanced detector 6 is configured for balanced detection on the third interference optical signal and the fourth interference optical signal, to generate a second differential current signal.

The electrical signal processing module 7 is configured to receive the first differential current signal and the second differential current signal, further process them after sampling, to restore service data.

The specific working principle is described as follows.

The signal light received by the receiver E(t) first enters the first beam splitter 1 and is split into the first signal light component $E_1(t)$ and the second signal light component $E_2(t)$, confirming to $E_1(t)=E_2(t)=1/\sqrt{2}E(t)$. Wherein the first signal light component reaches one input port of the double path bidirectional multiplexing delay interferometer 4 through the first circulator 2 and goes through a polarization-independent delayed self-interference. After that, because the phase difference between components of the first signal light component on the long arm and the short arm of the double path bidirectional multiplexing delay interferometer 4 is 0, the first interference optical signal $E_{out1}(t)$ and the second interference optical signal $E_{out2}(t)$ generated can be written as:

$$E_{out1}(t) = \frac{1}{2\sqrt{2}}[E(t) + E(t-\tau)]$$

$$E_{out2}(t) = \frac{1}{2\sqrt{2}}[E(t) - E(t-\tau)],$$

wherein $\tau$ is the delay corresponding to the arm length difference between the long arm and the short arm of the double path bidirectional multiplexing delay interferometer 4.

The first interference optical signal enters the second port of the first circulator 2 and is output from the third port thereof, and then enters the first balanced detector 5 simultaneously with the second interference optical signal for balanced detection, thereby generating a first differential current signal, namely an in-phase component, which can be written as:

$$I_I(t) = R\left[|E_{out1}(t)|^2 - |E_{out2}(t)|^2\right] = \frac{R}{2}|E(t)||E(t-\tau)|\cos(\omega\tau)$$
$$= \frac{R}{2}A(t)A(t-\tau)\cos(\omega\tau)$$

wherein R is the response efficiency of the photoelectrical detector, and $\omega$ is the angular frequency of the signal light.

The second signal light component reaches the other input port of the double path bidirectional multiplexing delay interferometer 4 through the second circulator 3 and goes through a polarization-independent delayed self-interference. After that, because the phase difference between components of the second signal light component on the long arm and the short arm of the double path bidirectional multiplexing delay interferometer 4 is $\pi/2$, the third interference optical signal $E_{out3}(t)$ and the fourth interference optical signal $E_{out4}(t)$ generated can be respectively written as:

$$E_{out3}(t) = \frac{1}{2\sqrt{2}}[E(t) + jE(t-\tau)]$$

$$E_{out4}(t) = \frac{1}{2\sqrt{2}}[E(t) - jE(t-\tau)].$$

The third interference optical signal enters the second port of the second circulator 3 and is output from the third port thereof, and then enters the second balanced detector 6 simultaneously with the fourth interference optical signal for balanced detection, thereby generating a second differential current signal, namely an quadrature component, which can be written as:

$$I_Q(t) = R\left[|E_{out3}(t)|^2 - |E_{out4}(t)|^2\right] = \frac{R}{2}|E(t)||E(t-\tau)|\sin(\omega\tau)$$
$$= \frac{R}{2}A(t)A(t-\tau)\sin(\omega\tau)$$

Finally, the electrical signal processing module 7 synthesizes the in-phase component and the quadrature component of an electrical signal into a complex signal, which can be written as:

$$u(t) = I_I(t) + jI_Q(t) = \frac{R}{2}E(t)E^*(t-\tau).$$

The above complex signal is sampled and digitally processed by the electrical signal processing module 7, to restore the electric field information of the signal light, so as to obtain service data.

Figure 2:
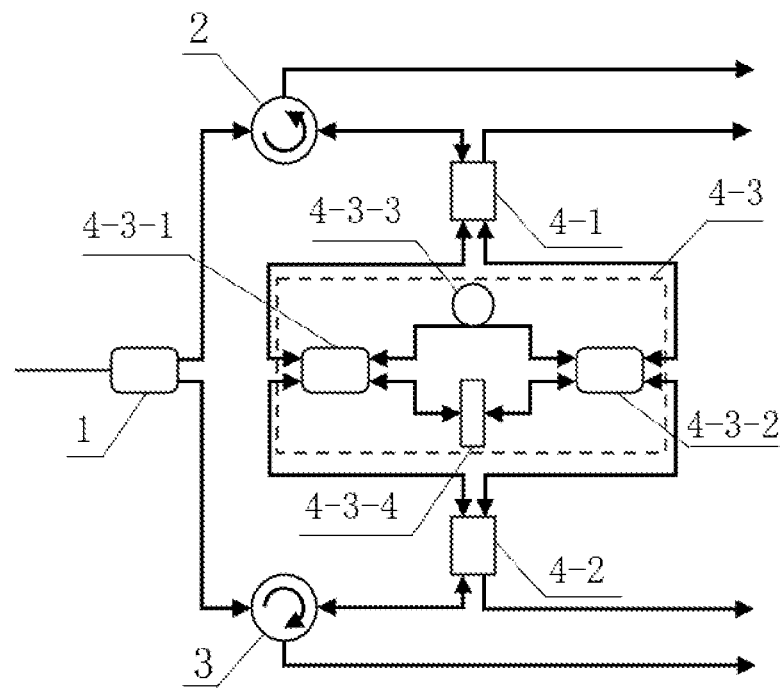
FIG. 2 is a schematic block diagram of an optical part of the self-coherent receiver based on single delay interferometer according to Embodiment 1 of the present disclosure.

FIG. 2 shows a self-coherent receiver based on single delay interferometer according to Embodiment 1 of the present disclosure.

The structure of the self-coherent receiver based on single delay interferometer is: the double path bidirectional multiplexing delay interferometer 4 includes a first polarization beam splitter 4-1, a second polarization beam splitter 4-2 and a delay interference apparatus 4-3.

One input port of the first polarization beam splitter 4-1 is connected to the second port of the first circulator 2 while the other input port is configured as one output port of the double path bidirectional multiplexing delay interferometer 4.

Two output ports of the first polarization beam splitter 4-1 are respectively connected to one input port and one output port of the delay interference apparatus through polarization-maintaining optical fibers.

One input port of the second polarization beam splitter 4-2 is connected to the second port of the second circulator 3 while the other input port is configured as the other output port of the double path bidirectional multiplexing delay interferometer 4.

Two output ports of the second polarization beam splitter 4-2 are respectively connected to the other input port and the other output port of the delay interference apparatus through polarization-maintaining optical fibers.

The delay interference apparatus 4-3 includes a second beam splitter 4-3-1, a third beam splitter 4-3-2, a first delay line 4-3-3 and a first quarter-wave plate 4-3-4.

An interior of the delay interference apparatus 4-3 is filled only with polarization-maintaining optical fibers.

An angle between a main axis of the first quarter-wave plate 4-3-4 and slow axis of the polarization-maintaining optical fibers is 0°.

One output port of the second beam splitter 4-3-1 is connected to one output port of the third beam splitter 4-3-2 through the first delay line 4-3-3 to constitute a long arm of the delay interference apparatus 4-3. The other output port of the second beam splitter 4-3-1 is connected to the other output port of the third beam splitter 4-3-2 through the first quarter-wave plate 4-3-4 to constitute a short arm of the delay interference apparatus 4-3.

Two input ports of the second beam splitter 4-3-1 are configured as the two input ports of the delay interference apparatus 4-3 respectively.

Two input ports of the third beam splitter 4-3-2 are configured as the two output ports of the delay interference apparatus 4-3 respectively.

The specific work process of Embodiment 1 is described below.

The signal light received by the receiver $E(t)$ first enters the first beam splitter 1 and is split into the first signal light component $E_1(t)$ and the second signal light component $E_2(t)$, conforming to $E_1(t)=E_2(t)=1/\sqrt{2}E(t)$. When the signal light reaches the receiver through the fiber channel, the polarization becomes random, which can be expressed as $$E(t) = A(t)e^{j(\omega t + \varphi_0)}\begin{bmatrix}\cos\theta \\ \sin\theta e^{j\delta}\end{bmatrix},$$

wherein $\theta$ is the angle between the horizontal polarization component and the vertical polarization component of the signal light, and $\delta$ is the phase difference between the both.

Before the first signal light component reaches the first polarization beam splitter 4-1 through the first circulator 2, the polarization state becomes:

$$E_1(t) = \frac{A(t)e^{j(\omega t+\varphi_0)}}{\sqrt{2}}\begin{bmatrix} \cos\theta_1 \\ \sin\theta e^{j\theta_2} \end{bmatrix},$$

and then is polarization-split by the first polarization beam splitter 4-1 into a first polarization component $E_{11}(t)$ and a second polarization component $E_{12}(t)$, which both propagate along the slow axis of the polarization-maintaining optical fiber.

Among them, $E_{11}(t)$ enters the second beam splitter 4-3-1 and is split into two components with equal amplitude, which respectively propagate along the slow axis of the long arm and the short arm of the delay interference apparatus 4-3, wherein the phase of the component propagating along the short arm remains unchanged when passing through the first quarter-wave plate 4-3-4, the phase difference between the components propagating along the long arm and short arm is 0. The two components perform a self-interference at the third beam splitter 4-3-2, to generate the first polarization interference optical signal and the second polarization interference optical signal, which are respectively $$E_{11out1}(t) = \frac{e^{j(\omega t+\varphi_0)}\cos\theta_1}{2\sqrt{2}}[A(t) + A(t-\tau)e^{-j\omega\tau}]$$

$$E_{11out2}(t) = \frac{e^{j(\omega t+\varphi_0)}\cos\theta_1}{2\sqrt{2}}[A(t) - A(t-\tau)e^{-j\omega\tau}].$$

$E_{12}(t)$ enters the third beam splitter 4-3-2 and is split into two components with equal amplitude, which respectively propagate along the slow axis of the long arm and the short arm of the delay interference apparatus 4-3, wherein the phase of the component propagating along the short arm remains unchanged when passing through the first quarter-wave plate 4-3-4, the phase difference between the components propagating along the long arm and the short arm is 0. The two components perform a self-interference at the second beam splitter 4-3-1, to generate the third polarization interference optical signal and the fourth polarization interference optical signal, which are respectively $$E_{12out1}(t) = \frac{e^{j(\omega t+\varphi_0)}\sin\theta_1 e^{j\delta_2}}{2\sqrt{2}}[A(t) + A(t-\tau)e^{-j\omega\tau}]$$

$$E_{12out2}(t) = \frac{e^{j(\omega t+\varphi_0)}\sin\theta_1 e^{j\delta_1}}{2\sqrt{2}}[A(t) - A(t-\tau)e^{-j\omega\tau}],$$

wherein the first polarization interference optical signal and the third polarization interference optical signal simultaneously enter the first polarization beam splitter 4-1 for polarization beam combining, to generate the first interference optical signal, $$E_{out1}(t) = \frac{e^{j(\omega t+\varphi_0)}}{2\sqrt{2}}[A(t) + A(t-\tau)e^{-j\omega\tau}]\begin{bmatrix} \sin\theta_1 e^{j\delta_1} \\ \cos\theta_1 \end{bmatrix},$$

wherein the second polarization interference optical signal and the fourth polarization interference optical signal simultaneously enter the second polarization beam splitter 4-2 for polarization beam combining, to generate the second interference optical signal, $$E_{out2}(t) = \frac{e^{j(\omega t+\varphi_0)}}{2\sqrt{2}}[A(t) - A(t-\tau)e^{-j\omega\tau}]\begin{bmatrix} \sin\theta_1 e^{j\delta_1} \\ \cos\theta_1 \end{bmatrix}.$$

The second interference optical signal directly enters one photoelectric detector of the first balanced detector 5, and the first interference optical signal enters the other photoelectric detector of the first balanced detector 5 after passing through the first circulator 2. The first differential current signal is generated after balanced detection, namely the in-phase component, which can be written as:

$$I_I(t) = R[|E_{out1}(t)|^2 - |E_{out2}(t)|^2] = \frac{R}{2}|E(t)||E(t-\tau)|\cos(\omega\tau)$$
$$= \frac{R}{2}A(t)A(t-\tau)\cos(\omega\tau)$$

R is the response efficiency of the photoelectric detector, and ω is the angular frequency of the signal light. It can be seen that the in-phase component based on self-interference of the signal output from the first balanced detector 5 is polarization-independent.

Before the second signal light component reaches the second polarization beam splitter 4-2 through the second circulator 3, the polarization state becomes:

$$E_2(t) = \frac{A(t)e^{j(\omega t+\varphi_0)}}{\sqrt{2}}\begin{bmatrix} \cos\theta_2 \\ \sin\theta_2 e^{j\delta_2} \end{bmatrix},$$

and then is polarization-split by the second polarization beam splitter 4-2 into a third polarization component $E_{21}(t)$ and a fourth polarization component $E_{22}(t)$, which both propagate along the fast axis of the polarization-maintaining optical fibers.

Wherein $E_{21}(t)$ enters the second beam splitter 4-3-1 and is split into two components with equal amplitude, which respectively propagate along the fast axis of the long arm and the short arm of the delay interference apparatus 4-3, wherein the phase of the component propagating along the short arm increases by π/2 when passing through the first quarter-wave plate 4-3-4, such that the phase difference between the components propagating along the long arm and the short arm is π/2. The two components perform a self-interference at the third beam splitter 4-3-2, to generate the fifth polarization interference optical signal and the sixth polarization interference optical signal, which are respectively $$E_{21out1}(t) = \frac{e^{j(\omega t+\varphi_0)}\cos\theta_2}{2\sqrt{2}}[A(t) - jA(t-\tau)e^{-j\omega\tau}]$$

$$E_{21out2}(t) = \frac{e^{j(\omega t+\varphi_0)}\cos\theta_2}{2\sqrt{2}}\left[A(t) - jA(t-\tau)e^{-j\omega t}\right].$$

$E_{22}(t)$ enters the third beam splitter 4-3-2 and is split into two components with equal amplitude, which respectively propagate along the fast axis of the long arm and the short arm of the delay interference apparatus 4-3, wherein the phase of the component propagating along the short arm increases by $\pi/2$ when passing through the first quarter-wave plate 4-3-4, such that the phase difference between the components propagating along the long arm and the short arm is $\pi/2$. The two components perform a self-interference at the second beam splitter 4-3-1, to generate the seventh polarization interference optical signal and the eighth polarization interference optical signal, which are respectively $$E_{22out1}(t) = \frac{e^{j(\omega t+\varphi_0)}\sin\theta_2 e^{j\delta_2}}{2\sqrt{2}}\left[A(t) + jA(t-\tau)e^{-j\omega t}\right]$$

$$E_{22out2}(t) = \frac{e^{j(\omega t+\varphi_0)}\sin\theta_2 e^{j\delta_2}}{2\sqrt{2}}\left[A(t) - jA(t-\tau)e^{-j\omega t}\right],$$

wherein the fifth polarization interference optical signal and the seventh polarization interference optical signal simultaneously enter the second polarization beam splitter 4-2 for polarization beam combining, to generate the third interference optical signal:

$$E_{out3}(t) = \frac{e^{j(\omega t+\varphi_0)}}{2\sqrt{2}}\left[A(t) + jA(t-\tau)e^{-j\omega t}\right]\begin{bmatrix}\sin\theta_2 e^{j\delta_2}\\ \cos\theta_2\end{bmatrix}.$$

The sixth polarization interference optical signal and the eighth polarization interference optical signal simultaneously enter the first polarization beam splitter 4-1 for polarization beam combining, to generate the fourth interference optical signal:

$$E_{out4}(t) = \frac{e^{j(\omega t+\varphi_0)}}{2\sqrt{2}}\left[A(t) - A(t-\tau)e^{-j\omega t}\right]\begin{bmatrix}\sin\theta_2 e^{j\delta_2}\\ \cos\theta_2\end{bmatrix}.$$

The fourth interference optical signal directly enters one photoelectric detector of the second balanced detector 6, and the third interference optical signal enters the other photoelectric detector of the second balanced detector 6 after passing through the second circulator 3. The second differential current signal is generated after balanced detection, namely the quadrature component, which can be written as:

$$I_Q(t) = R\left[|E_{out5}(t)|^2 - |E_{out4}(t)|^2\right] = \frac{R}{2}|E(t)||E(t-\tau)|\sin(\omega\tau)$$
$$= \frac{R}{2}A(t)A(t-\tau)\sin(\omega\tau)$$

It can be seen that quadrature component based on self-interference of the signal output from the second balanced detector 6 is polarization-independent.

Finally, the electrical signal processing module 7 synthesizes the in-phase component and the quadrature component of an electrical signal into a complex signal, which can be written as:

$$u(t) = I_I(t) = jI_Q(t) = \frac{R}{2}E(t)E^*(t-\tau).$$

The above complex signal is sampled and digitally processed by the electrical signal processing module 7, to restore the electric field information of the signal light, so as to obtain service data.

Figure 3:
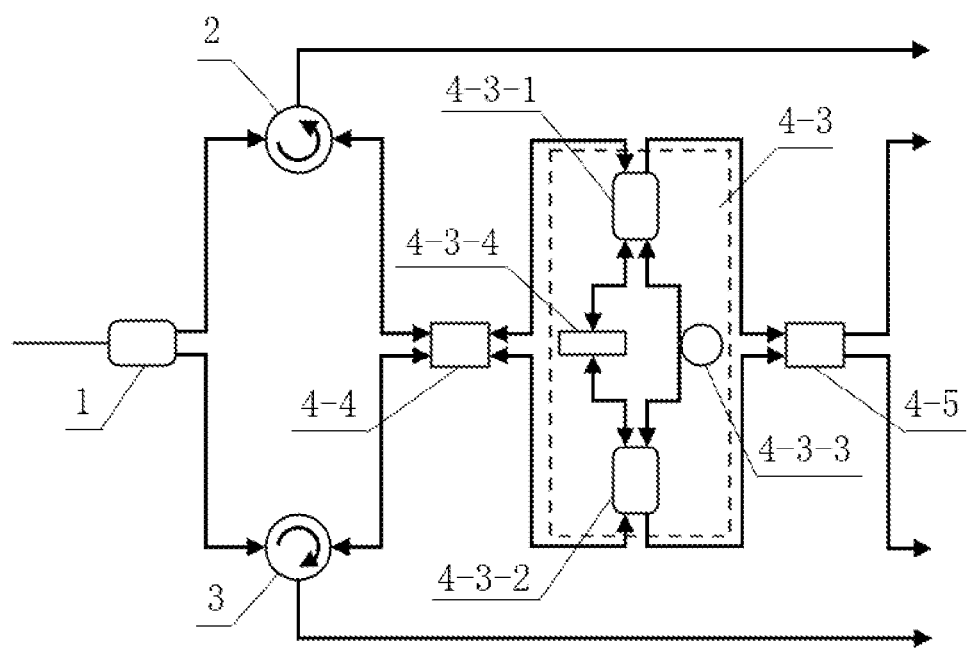
FIG. 3 is a schematic block diagram of an optical part of the self-coherent receiver based on single delay interferometer according to Embodiment 2 of the present disclosure.

FIG. 3 shows a self-coherent receiver based on single delay interferometer according to Embodiment 2 of the present disclosure.

The structure of the self-coherent receiver based on single delay interferometer is: the double path bidirectional multiplexing delay interferometer 4 includes a third polarization beam splitter 4-4, a fourth polarization beam splitter 4-5 and a delay interference apparatus 4-3.

Two input ports of the third polarization beam splitter 4-4 are respectively connected to the second port of the first circulator 2 and the second port of the second circulator 3 through polarization-maintaining optical fibers while two output ports are respectively connected to one input port and one output port of the delay interference apparatus.

Two input ports of the fourth polarization beam splitter 4-5 are respectively connected to the other input port and the other output port of the delay interference apparatus through polarization-maintaining optical fibers while two output ports are respectively configured as the two output ports of the double path bidirectional multiplexing delay interferometer 4.

The delay interference apparatus 4-3 includes a second beam splitter 4-3-1, a third beam splitter 4-3-2, a first delay line 4-3-3 and a first quarter-wave plate 4-3-4.

The interior of the delay interference apparatus 4-3 is filled only with polarization-maintaining optical fibers.

The angle between the main axis of the first quarter-wave plate 4-3-4 and the slow axis of the polarization-maintaining optical fibers is 0°.

One output port of the second beam splitter 4-3-1 is connected to one output port of the third beam splitter 4-3-2 through the first delay line 4-3-3 to constitute the long arm of the delay interference apparatus 4-3. The other output port of the second beam splitter 4-3-1 is connected to the other output port of the third beam splitter 4-3-2 through the first quarter-wave plate 4-3-4 to constitute the short arm of the delay interference apparatus 4-3.

Two input ports of the second beam splitter 4-3-1 are configured as the two input ports of the delay interference apparatus 4-3 respectively.

Two input ports of the third beam splitter 4-3-2 are configured as the two output ports of the delay interference apparatus 4-3 respectively.

The specific work process of Embodiment 2 is described below.

The signal light received by the receiver E(t) first enters the first beam splitter 1 and is split into the first signal light component $E_1(t)$ and the second signal light component $E_2(t)$, satisfying $E_1(t)=E_2(t)=1/\sqrt{2}E(t)$. When the signal light reaches the receiver through the fiber channel, the polarization becomes random, which can be expressed as $$E(t) = A(t)e^{j(\omega t + \varphi_0)} \begin{bmatrix} \cos\theta \\ \sin\theta e^{j\delta} \end{bmatrix},$$

wherein θ is the angle between the horizontal polarization component and the vertical polarization component of the signal light, and δ is the phase difference between the both.

Before the first signal light component reaches the third polarization beam splitter 4-4 through the first circulator 2, the polarization state becomes:

$$E_1(t) = \frac{A(t)e^{j(\omega t + \varphi_0)}}{\sqrt{2}} \begin{bmatrix} \cos\theta_1 \\ \sin\theta_1 e^{j\delta_1} \end{bmatrix},$$

and then is polarization-split by the third polarization beam splitter 4-4 into a first polarization component $E_{11}(t)$ and a second polarization component $E_{12}(t)$, which both propagate along the slow axis of the polarization-maintaining optical fibers.

Among them, $E_{11}(t)$ enters the second beam splitter 4-3-1 and is split into two components with equal amplitude, which respectively propagate along the slow axis of the long arm and the short arm of the delay interference apparatus 4-3, wherein the phase of the component propagating along the short arm remains unchanged when passing through the first quarter-wave plate 4-3-4, the phase difference of the components propagating along the long arm and the short arm is 0. The two components perform a self-interference at the third beam splitter 4-3-2, to generate the first polarization interference optical signal and the second polarization interference optical signal, which are respectively $$E_{11out1}(t) = \frac{e^{j(\omega t, \varphi_0)}\cos\theta_1}{2\sqrt{2}} [A(t) + A(t-\tau)e^{-j\omega\tau}]$$

$$E_{11out2}(t) = \frac{e^{j(\omega t + \varphi_0)}\cos\theta_1}{2\sqrt{2}} [A(t) - A(t-\tau)e^{-j\omega\tau}].$$

$E_{12}(t)$ enters the third beam splitter 4-3-2 and is split into two components with equal amplitude, which respectively propagate along the slow axis of the long arm and the short arm of the delay interference apparatus 4-3, wherein the phase of the component propagating along the short arm remains unchanged when passing through the first quarter-wave plate 4-3-4, the phase difference between the components propagating along the long arm and the short arm is 0. The two components perform a self-interference at the second beam splitter 4-3-1, to generate the third polarization interference optical signal and the fourth polarization interference optical signal, which are respectively $$E_{12out1}(t) = \frac{e^{j(\omega t + \varphi_0)}\sin\theta_1 e^{j\delta_1}}{2\sqrt{2}} [A(t) + A(t-\tau)e^{-j\omega\tau}]$$

$$E_{12out2}(t) = \frac{e^{j(\omega t + \varphi_0)}\sin\theta_1 e^{j\delta_1}}{2\sqrt{2}} [A(t) - A(t-\tau)e^{-j\omega\tau}].$$

wherein the first polarization interference optical signal and the third polarization interference optical signal simultaneously enter the third polarization beam splitter 4-4 for polarization beam combining, to generate the first interference optical signal, $$E_{out1}(t) = \frac{2^{j(\omega t + \varphi_0)}}{2\sqrt{2}} [A(t) + A(t-\tau)e^{-j\omega\tau}] \begin{bmatrix} \sin\theta_1 e^{j\delta_1} \\ \cos\theta_1 \end{bmatrix}.$$

The second polarization interference optical signal and the fourth polarization interference optical signal simultaneously enter the fourth polarization beam splitter 4-5 for polarization beam combining, to generate the second interference optical signal, $$E_{out2}(t) = \frac{e^{j(\omega t + \varphi_0)}}{2\sqrt{2}} [A(t) - A(t-\tau)e^{-j\omega\tau}] \begin{bmatrix} \sin\theta_1 e^{j\delta_1} \\ \cos\theta_1 \end{bmatrix}.$$

The second interference optical signal directly enters one photoelectric detector of the first balanced detector 5 after being output from one output port of the fourth polarization beam splitter 4-5, while the first interference optical signal enters the other photoelectric detector of the first balanced detector 5 after passing through the first circulator 2. The first differential current signal is generated after balanced detection, namely the in-phase component, which can be written as:

$$I_I(t) = R[|E_{out1}(t)|^2 - |E_{out2}(t)|^2] = \frac{R}{2}|E(t)||E(t-\tau)|\cos(\omega\tau) = \frac{R}{2}A(t)A(t-\tau)\cos(\omega\tau).$$

R is the response efficiency of the photoelectric detector, and ω is the angular frequency of the signal light. It can be seen that in-phase component based on self-interference of the signal output from the first balanced detector 5 is polarization-independent.

Before the second signal light component reaches the third polarization beam splitter 4-4 through the second circulator 3, the polarization state becomes:

$$E_2(t) = \frac{A(t)e^{j(\omega t + \varphi_0)}}{\sqrt{2}} \begin{bmatrix} \cos\theta_2 \\ \sin\theta_2 e^{j\delta_2} \end{bmatrix},$$

and then is polarization-split by the third polarization beam splitter 4-4 into the third polarization component $E_{21}(t)$ and the fourth polarization component $E_{22}(t)$, which both propagate along the fast axis of the polarization-maintaining optical fibers.

Wherein $E_{21}(t)$ enters the second beam splitter 4-3-1 and is split into two components with equal amplitude, which respectively propagate along the fast axis of the long arm and the short arm of the delay interference apparatus 4-3, wherein the phase of the component propagating along the short arm increases by π/2 when passing through the first quarter-wave plate 4-3-4, such that the phase difference between the components propagating along the long arm and the short arm is π/2. The two components perform a self-interference at the third beam splitter 4-3-2, to generate the fifth polarization interference optical signal and the sixth polarization interference optical signal, which are respectively $$E_{21out1}(t) = \frac{e^{j(\omega t+\varphi_0)}\cos\theta_2}{2\sqrt{2}}\left[A(t) + jA(t-\tau)e^{-j\omega\tau}\right]$$

$$E_{21out2}(t) = \frac{e^{j(\omega t+\varphi_0)}\cos\theta_2}{2\sqrt{2}}\left[A(t) - jA(t-\tau)e^{-j\omega\tau}\right].$$

$E_{22}(t)$ enters the third beam splitter 4-3-2 and is split into two components with equal amplitude, which respectively propagate along the fast axis of the long arm and the short arm of the delay interference apparatus 4-3, wherein the phase of the component propagating along the short arm increases by π/2 when passing through the first quarter-wave plate 4-3-4, such that the phase difference of the components propagating along the long arm and the short arm is π/2. The two components perform a self-interference at the second beam splitter 4-3-1, to generate the seventh polarization interference optical signal and the eighth polarization interference optical signal, which are respectively $$E_{22out1}(t) = \frac{e^{j(\omega t+\varphi_0)}\sin\theta_2 e^{j\delta_2}}{2\sqrt{2}}\left[A(t) + jA(t-\tau)e^{-j\omega\tau}\right]$$

$$E_{22out2}(t) = \frac{e^{j(\omega t-\varphi_2)}\sin\theta_2 e^{j\delta_2}}{2\sqrt{2}}\left[A(t) - jA(t-\tau)e^{-j\omega\tau}\right].$$

wherein the fifth polarization interference optical signal and the seventh polarization interference optical signal simultaneously enter the third polarization beam splitter 4-4 for polarization beam combining, to generate the third interference optical signal:

$$E_{out3}(t) = \frac{e^{j(\omega t+\varphi_0)}}{2\sqrt{2}}\left[A(t) + jA(t-\tau)e^{-j\omega\tau}\right]\begin{bmatrix}\sin\theta_2 e^{j\delta_2}\\\cos\theta_2\end{bmatrix}.$$

The sixth polarization interference optical signal and the eighth polarization interference optical signal simultaneously enter the fourth polarization beam splitter 4-5 for polarization beam combining, to generate the fourth interference optical signal:

$$E_{out4}(t) = \frac{e^{j(\omega t+\varphi_0)}}{2\sqrt{2}}\left[A(t) - A(t-\tau)e^{-j\omega\tau}\right]\begin{bmatrix}\sin\theta_2 e^{j\delta_2}\\\cos\theta_2\end{bmatrix}.$$

The fourth interference optical signal directly enters one photoelectric detector of the second balanced detector 6 after being output from the other output port of the fourth polarization beam splitter 4-5, and the third interference optical signal enters the other photoelectric detector of the second balanced detector 6 after passing through the second circulator 3. The second differential current signal is generated after balanced detection, namely the quadrature component, which can be written as:

$$I_c(t) = R\left[|E_{out5}(t)|^2 - |E_{out4}(t)|^2\right] = \frac{R}{2}|E(t)||E(t-\tau)|\sin(\omega\tau) = \frac{R}{2}A(t)A(t-\tau)\sin(\omega\tau).$$

It can be seen that the quadrature component based on self-interference of the signal output from the second balanced detector 6 is polarization-independent.

Finally, the electrical signal processing module 7 synthesizes the in-phase component and the quadrature component of an electrical signal into a complex signal, which can be written as:

$$u(t) = I_I(t) + jI_Q(t) = \frac{R}{2}E(t)E^*(t-\tau).$$

The above complex signal is sampled and digitally processed by the electrical signal processing module 7, to restore the electric field information of the signal light, so as to obtain service data.

Figure 4:
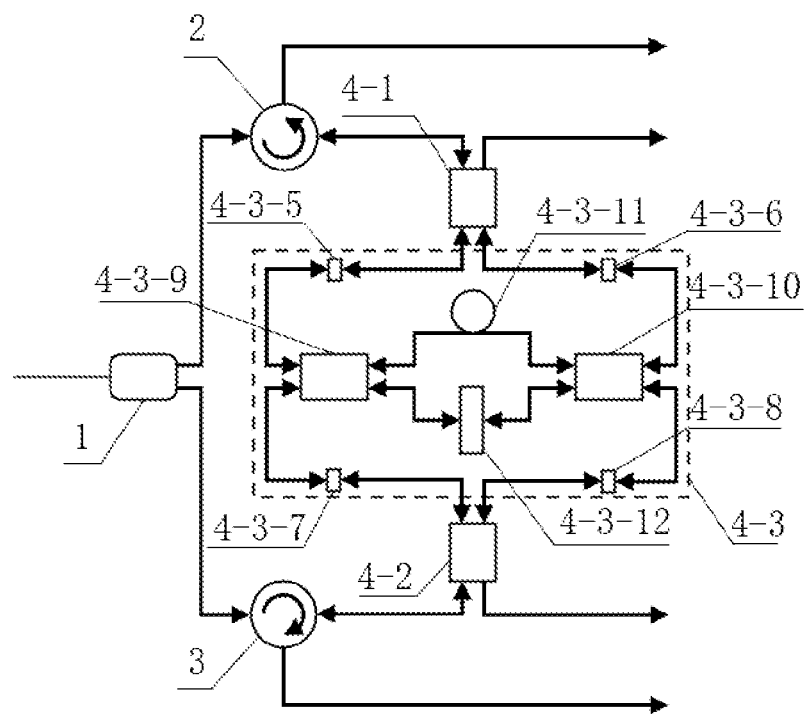
FIG. 4 is a schematic block diagram of an optical part of the self-coherent receiver based on single delay interferometer according to Embodiment 3 of the present disclosure.

FIG. 4 shows a self-coherent receiver based on single delay interferometer according to Embodiment 3 of the present disclosure.

The structure of the self-coherent receiver based on single delay interferometer is: the double path bidirectional multiplexing delay interferometer 4 includes a first polarization beam splitter 4-1, a second polarization beam splitter 4-2 and a delay interference apparatus 4-3.

One input port of the first polarization beam splitter 4-1 is connected to the second port of the first circulator 2, and the other input port is configured as one output port of the double path bidirectional multiplexing delay interferometer 4.

Two output ports of the first polarization beam splitter 4-1 are respectively connected to one input port and one output port of the delay interference apparatus through polarization-maintaining optical fibers.

One input port of the second polarization beam splitter 4-2 is connected to the second port of the second circulator 3 while the other input port is configured as the other output port of the double path bidirectional multiplexing delay interferometer 4.

Two output ports of the second polarization beam splitter 4-2 are respectively connected to the other input port and the other output port of the delay interference apparatus through polarization-maintaining optical fibers.

The delay interference apparatus 4-3 includes a first 45° polarization rotation structure 4-3-5, a second 45° polarization rotation structure 4-3-6, a third 45° polarization rotation structure 4-3-7, a fourth 45° polarization rotation structure 4-3-8, a fifth polarization beam splitter 4-3-9, a sixth polarization beam splitter 4-3-10, a second delay line 4-3-11 and a second quarter-wave plate 4-3-12.

An interior of the delay interference apparatus 4-3 is filled only with polarization-maintaining optical fibers.

The angle between the main axis of the second quarter-wave plate 4-3-12 and the slow axis of the polarization-maintaining optical fibers is 0°.

One output port of the fifth polarization beam splitter 4-3-9 is connected to one output port of the sixth polarization beam splitter 4-3-10 through the second delay line 4-3-11 to constitute the long arm of the delay interference apparatus 4-3. The other output port of the fifth polarization beam splitter 4-3-9 is connected to the other output port of the sixth polarization beam splitter 4-3-10 through the second quarter-wave plate 4-3-12 to constitute the short arm of the delay interference apparatus 4-3.

Two input ports of the fifth polarization beam splitter 4-3-9 are configured as the two input ports of the delay interference apparatus 4-3 respectively.

Two input ports of the sixth polarization beam splitter 4-3-10 are configured as the two output ports of the delay interference apparatus 4-3 respectively.

The first 45° polarization rotation structure 4-3-5, the second 45° polarization rotation structure 4-3-6, the third 45° polarization rotation structure 4-3-7, the fourth 45° polarization rotation structure 4-3-8 are correspondingly provided at the optical fibers at the two input ports and the two output ports of the delay interference apparatus 4-3.

The specific work process of Embodiment 3 is described below.

The signal light received by the receiver E(t) first enters the first beam splitter 1 and is split into the first signal light component $E_1(t)$ and the second signal light component $E_2(t)$, satisfying $E_1(t)=E_2(t)=1/\sqrt{2}E(t)$. When the signal light reaches the receiver through the fiber channel, the polarization becomes random, which can be expressed as $$E(t) = A(t)e^{j(\omega t+\varphi_0)}\begin{bmatrix} \cos\theta \\ \sin\theta e^{j\delta} \end{bmatrix},$$

wherein θ is the angle between the horizontal polarization component and the vertical polarization component of the signal light, and δ is the phase difference between the both.

Before the first signal light component reaches the first polarization beam splitter 4-1 through the first circulator 2, the polarization state becomes:

$$E_1(t) = \frac{A(t)e^{j(\omega t+\varphi_0)}}{\sqrt{2}}\begin{bmatrix} \cos\theta_1 \\ \sin\theta_1 e^{j\delta_1} \end{bmatrix},$$

and then is polarization-split by the first polarization beam splitter 4-4 into the first polarization component $E_{11}(t)$ and the second polarization component $E_{12}(t)$, wherein after passing through the first 45° polarization rotation structure 4-3-5 the polarization state of $E_{11}(t)$ becomes:

$$E_{11}(t) = \frac{A(t)e^{j(\omega t+\varphi_0)}}{2}\begin{bmatrix} \cos\theta_1 \\ \cos\theta_1 \end{bmatrix},$$

and then is polarization-split by the fifth polarization beam splitter 4-9 into two polarization components, which respectively enter the long arm and the short arm of the delay interference apparatus and both propagate along the slow axis of the polarization-maintaining optical fibers, wherein the phase of the component propagating along the short arm remains unchanged when passing through the second quarter-wave plate 4-3-12, the phase difference of the components propagating along the long arm and the short arm is 0. The two components perform a polarization combining-interference at the sixth polarization beam splitter 4-3-10, to generate the first polarization interference optical signal, the polarization state thereof is:

$$E_{11out}(t) = \frac{e^{j(\omega t+\varphi_0)}\cos\theta_1}{2}\begin{bmatrix} A(t) \\ A(t-\tau)e^{-j\omega\tau} \end{bmatrix},$$

which after passing through the second 45° polarization rotation structure 4-3-6 becomes:

$$E_{11out}(t) = \frac{e^{j(\omega t+\varphi_0)}\cos\theta_1}{2\sqrt{2}}\begin{bmatrix} A(t)+A(t-\tau)e^{-j\omega\tau} \\ A(t)-A(t-\tau)e^{-j\omega\tau} \end{bmatrix}.$$

The polarization state of $E_{12}(t)$ after passing through the second 45° polarization rotation structure 4-3-6 becomes:

$$E_{12}(t) = \frac{A(t)e^{j(\omega t+\varphi_0)}}{2}\begin{bmatrix} \sin\theta_1 e^{j\delta_1} \\ \sin\theta_1 e^{j\delta_1} \end{bmatrix},$$

and then is polarization-split by the sixth polarization beam splitter 4-3-10 into two polarization components, which respectively enter the long arm and the short arm of the delay interference apparatus and both propagate along the slow axis of the polarization-maintaining optical fibers, wherein the phase of the component propagating along the short arm remains unchanged when passing through the second quarter-wave plate 4-3-12, and the phase difference between the components propagating along the long arm and the short arm is 0. The both perform a polarization combining-interference at the fifth polarization beam splitter 4-3-9, to generate the second polarization interference optical signal, the polarization state thereof is:

$$E_{12out}(t) = \frac{e^{j(\omega t+\varphi_0)}\sin\theta_1 e^{j\delta_1}}{2}\begin{bmatrix} A(t) \\ A(t-\tau)e^{-j\omega\tau} \end{bmatrix},$$

which after passing through the first 45° polarization rotation structure 4-3-5 becomes:

$$E_{12out}(t) = \frac{e^{j(\omega t+\varphi_0)}\sin\theta_1 e^{j\delta_1}}{2\sqrt{2}}\begin{bmatrix} A(t)+A(t-\tau)e^{-j\omega\tau} \\ A(t)-A(t-\tau\_e^{-j\omega\tau}) \end{bmatrix}.$$

The horizontal polarization component of the first polarization interference optical signal $E_{11out}(t)$ and the horizontal polarization component of the second polarization interference optical signal $E_{12out}(t)$ are simultaneously output from one input port of the first polarization beam splitter 4-1 and combined to the first interference optical signal, the polarization state thereof is:

$$E_{out1}(t) = \frac{e^{j(\omega t+\varphi_0)}}{2\sqrt{2}}[A(t)+A(t-\tau)e^{-j\omega\tau}]\begin{bmatrix} \sin\theta_1 e^{j\delta_1} \\ \cos\theta_1 \end{bmatrix}.$$

The vertical polarization component of the first polarization interference optical signal $E_{11out}(t)$ and the vertical polarization component of the second polarization interference optical signal $E_{12out}(t)$ are simultaneously output from the other input port of the first polarization beam splitter 4-1 and combined to the second interference optical signal, the polarization state thereof is:

$$E_{out2}(t) = \frac{e^{j(\omega t + \varphi_0)}}{2\sqrt{2}} [A(t) - A(t-\tau)e^{-j\omega\tau}] \begin{bmatrix} \sin\theta_1 e^{j\delta_1} \\ \cos\theta_1 \end{bmatrix}.$$

The second interference optical signal directly enters one photoelectric detector of the first balanced detector 5, while the first interference optical signal enters the other photoelectric detector of the first balanced detector 5 after passing through the first circulator 2. The first differential current signal is generated after balanced detection, namely the in-phase component, which can be written as:

$$I_I(t) = R[|E_{out1}(t)|^2 - |E_{out2}(t)|^2] = \frac{R}{2}|E(t)||E(t-\tau)|\cos(\omega\tau) = \frac{R}{2}A(t)A(t-\tau)\cos(\omega\tau).$$

R is the response efficiency of the photoelectric detector, and ω is the angular frequency of the signal light. It can be seen that the in-phase component based on self-interference of the signal output from the first balanced detector 5 is polarization-independent.

Before the second signal light component reaches the second polarization beam splitter 4-2 through the second circulator 3, the polarization state becomes:

$$E_1(t) = \frac{A(t)e^{j(\omega t + \varphi_0)}}{\sqrt{2}} \begin{bmatrix} \cos\theta_2 \\ \sin\theta_2 e^{j\delta_2} \end{bmatrix},$$

and then is polarization-split by the second polarization beam splitter 4-2 into a third polarization component $E_{21}(t)$ and a fourth polarization component $E_{22}(t)$. The polarization state of $E_{21}(t)$ after passing through the third 45° polarization rotation structure 4-3-5 becomes:

$$E_{21}(t) = \frac{A(t)e^{j(\omega t + \varphi_0)}}{2} \begin{bmatrix} \cos\theta_2 \\ \cos\theta_2 \end{bmatrix},$$

and then is polarization-split by the fifth polarization beam splitter 4-3-9 into two polarization components, which respectively enter the long arm and the short arm of the delay interference apparatus and both propagate along the fast axis of the polarization-maintaining optical fibers, wherein the phase of the component propagating along the short arm increases by π/2 when passing through the second quarter-wave plate 4-3-12, such that the phase difference of the components propagating along the long arm and the short arm is π/2. The two components perform a polarization combining-interference at the sixth polarization beam splitter 4-3-10, to generate the third polarization interference optical signal, the polarization state thereof is:

$$E_{21out}(t) = \frac{2^{j(\omega t + \varphi_2)}\cos\theta_2}{2} \begin{bmatrix} A(t) \\ jA(t-\tau)e^{-j\omega\tau} \end{bmatrix},$$

which after passing through the fourth 45° polarization rotation structure 4-3-8 becomes:

$$E_{21out}(t) = \frac{A(t)e^{j(\omega t + \varphi_0)}\cos\theta_2}{2\sqrt{2}} \begin{bmatrix} A(t) + jA(t-\tau)e^{-j\omega\tau} \\ A(t) - jA(t-\tau)e^{-j\omega\tau} \end{bmatrix}.$$

The polarization state of $E_{22}(t)$ after passing through the fourth 45° polarization rotation structure 4-3-8 becomes:

$$E_{22}(t) = \frac{A(t)e^{j(\omega t + \varphi_0)}}{2} \begin{bmatrix} \sin\theta_2 e^{j\delta_2} \\ \sin\theta_2 e^{j\delta_2} \end{bmatrix},$$

and then is polarization-split by the sixth polarization beam splitter 4-3-10 into two polarization components, which respectively enter the long arm and the short arm of the delay interference apparatus and both propagate along the fast axis of the polarization-maintaining optical fibers, wherein the phase of the component propagating along the short arm increases by π/2 when passing through the second quarter-wave plate 4-3-12, such that the phase difference of the components propagating along the long arm and the short arm is π/2. The two components perform a polarization combining-interference at the fifth polarization beam splitter 4-3-9, to generate the fourth polarization interference optical signal, the polarization state thereof is:

$$E_{22out}(t) = \frac{e^{j(\omega t + \varphi_0)}\sin\theta_2 e^{j\delta_2}}{2} \begin{bmatrix} A(t) \\ jA(t-\tau)e^{-j\omega\tau} \end{bmatrix},$$

which after passing through the third 45° polarization rotation structure 4-3-7 becomes:

$$E_{22out}(t) = \frac{e^{j(\omega t + \varphi_0)}\sin\theta_2 e^{j\delta_2}}{2\sqrt{2}} \begin{bmatrix} A(t) + jA(t-\tau)e^{-j\omega\tau} \\ A(t) - jA(t-\tau)e^{-j\omega\tau} \end{bmatrix}.$$

The horizontal polarization component of the third polarization interference optical signal $E_{21out}(t)$ and the horizontal polarization component of the fourth polarization interference optical signal $E_{22out}(t)$ are simultaneously output from one input port of the second polarization beam splitter 4-2 and combined to the third interference optical signal, the polarization state thereof is:

$$E_{out3}(t) = \frac{e^{j(\omega t + \varphi_0)}}{2\sqrt{2}} [A(t) + jA(t-\tau)e^{-j\omega\tau}] \begin{bmatrix} \sin\theta_2 e^{j\delta_2} \\ \cos\theta_2 \end{bmatrix}.$$

The vertical polarization component of the third polarization interference optical signal $E_{21out}(t)$ and the vertical polarization component of the fourth polarization interference optical signal $E_{22out}(t)$ are simultaneously output from the other input port of the second polarization beam splitter 4-2 and combined to the fourth interference optical signal, the polarization state thereof is:

$$E_{out4}(t) = \frac{e^{j(\omega t+\varphi_0)}}{2\sqrt{2}}[A(t) - jA(t-\tau)e^{-j\omega\tau}]\begin{bmatrix}\sin\theta_2 e^{j\delta_2}\\ \cos\theta_2\end{bmatrix}.$$

The fourth interference optical signal directly enters one photoelectric detector of the second balanced detector 6, while the third interference optical signal enters the other photoelectric detector of the second balanced detector 6 after passing through the second circulator 3. The second differential current signal is generated after balanced detection, namely the quadrature component, which can be written as:

$$I_Q(t) = R[|E_{out3}(t)|^2 - |E_{out4}(t)|^2] = \frac{R}{2}|E(t)||E(t-\tau)|\sin(\omega\tau)$$
$$= \frac{R}{2}A(t)A(t-\tau)\sin(\omega\tau)$$

It can be seen that the quadrature component based on self-interference of the signal output from the second balanced detector 6 is polarization-independent.

Finally, the electrical signal processing module 7 synthesizes the in-phase component and the quadrature component of an electrical signal into a complex signal, which can be written as:

$$u(t) = I_I(t) + jI_Q(t) = \frac{R}{2}E(t)E^*(t-\tau).$$

The above complex signal is sampled and digitally processed by the electrical signal processing module 7, to restore the electric field information of the signal light, so as to obtain service data.

Figure 5:
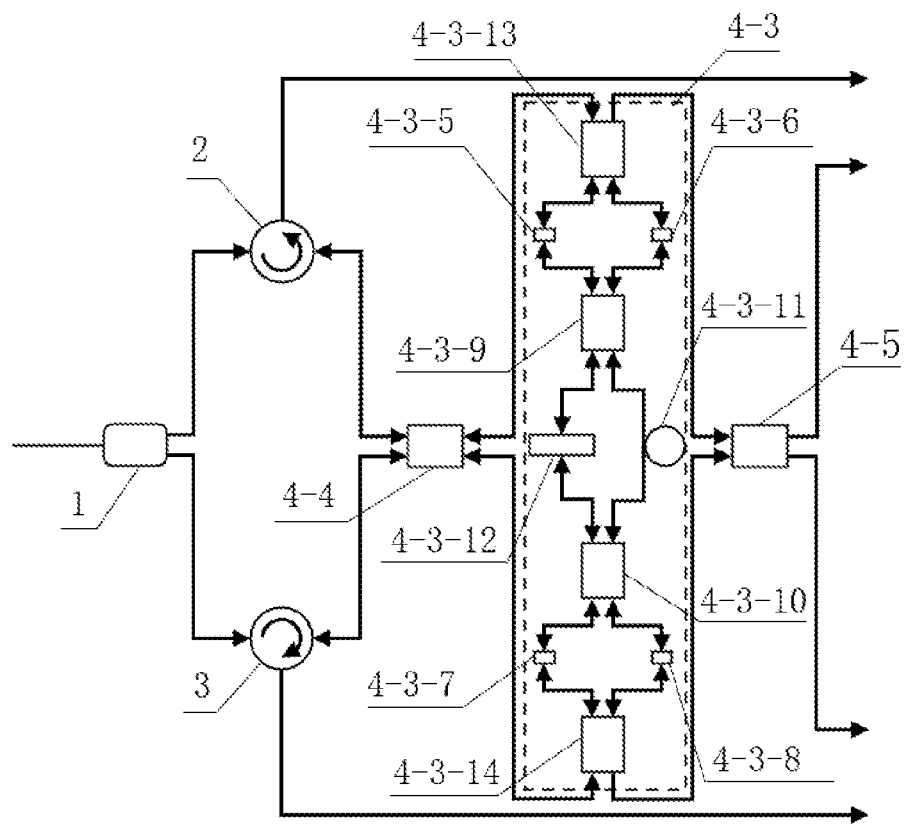
FIG. 5 a schematic block diagram of an optical part of the self-coherent receiver based on single delay interferometer according to Embodiment 4 of the present disclosure.

FIG. 5 shows a self-coherent receiver based on single delay interferometer according to Embodiment 4 of the present disclosure.

The structure of the self-coherent receiver based on single delay interferometer is: the double path bidirectional multiplexing delay interferometer 4 includes a third polarization beam splitter 4-4, a fourth polarization beam splitter 4-5 and a delay interference apparatus 4-3.

Two input ports of the third polarization beam splitter 4-4 are respectively connected to the second port of the first circulator 2 and the second port of the second circulator 3 through polarization-maintaining optical fibers while two output ports are respectively connected to one input port and one output port of the delay interference apparatus.

Two input ports of the fourth polarization beam splitter 4-5 are respectively connected to the other input port and the other output port of the delay interference apparatus through polarization-maintaining optical fibers while two output ports are respectively configured as the two output ports of the double path bidirectional multiplexing delay interferometer 4.

The delay interference apparatus 4-3 includes a first 45° polarization rotation structure 4-3-5, a second 45° polarization rotation structure 4-3-6, a third 45° polarization rotation structure 4-3-7, a fourth 45° polarization rotation structure 4-3-8, a fifth polarization beam splitter 4-3-9, a sixth polarization beam splitter 4-3-10, a second delay line 4-3-11 and a second quarter-wave plate 4-3-12, a seventh polarization beam splitter 4-3-13 and an eighth polarization beam splitter 4-3-14.

An interior of the delay interference apparatus 4-3 is filled only with polarization-maintaining optical fibers.

The angle between the main axis of the second quarter-wave plate 4-3-12 and the slow axis of the polarization-maintaining optical fiber is 0°.

One output port of the fifth polarization beam splitter 4-3-9 is connected to one output port of the sixth polarization beam splitter 4-3-10 through the second delay line 4-3-11 to constitute the long arm of the delay interference apparatus 4-3. The other output port of the fifth polarization beam splitter 4-3-9 is connected to the other output port of the sixth polarization beam splitter 4-3-10 through the second quarter-wave plate 4-3-12 to constitute the short arm of the delay interference apparatus 4-3.

Two output ports of the seventh polarization beam splitter 4-3-13 are respectively connected to the two input ports of the fifth polarization beam splitter 4-3-10 through the first 45° polarization rotation structure 4-3-5 and the second 45° polarization rotation structure 4-3-6.

Two output ports of the eighth polarization beam splitter 4-3-14 are respectively connected to the two input ports of the sixth polarization beam splitter 4-3-9 through the third 45° polarization rotation structure 4-3-5 and the fourth 45° polarization rotation structure 4-3-6.

Two input ports of the seventh polarization beam splitter 4-3-13 are respectively configured as the two input ports of the delay interference apparatus 4-3.

Two input ports of the eighth polarization beam splitter 4-3-8 are respectively configured as the two output ports of the delay interference apparatus 4-3.

The specific work process of Embodiment 4 is described below.

The signal light received by the receiver E(t) first enters the first polarization beam splitter 1 and is split into the first signal light component $E_1(t)$ and the second signal light component $E_2(t)$, satisfying $E_1(t)=E_2(t)=1/\sqrt{2}E(t)$. When the signal light reaches the receiver through the fiber channel, the polarization becomes random, which can be expressed as $$E(t) = A(t)e^{j(\omega t+\varphi_0)}\begin{bmatrix}\cos\theta\\ \sin\theta_2 e^{j\delta}\end{bmatrix},$$

wherein θ is the angle between the horizontal polarization component and the vertical polarization component of the signal light, and δ is the phase difference between the both.

Before the first signal light component reaches the third polarization beam splitter 4-4 through the first circulator 2, the polarization state becomes:

$$E_1(t) = \frac{A(t)e^{j(\omega t+\varphi_0)}}{\sqrt{2}}\begin{bmatrix}\cos\theta_1\\ \sin\theta_1 e^{j\delta_1}\end{bmatrix},$$

and then is polarization-split by the third polarization beam splitter 4-4 into a first polarization component $E_{11}(t)$ and a second polarization component $E_{12}(t)$, which both propagate along the slow axis of the polarization-maintaining optical fibers. $E_{11}(t)$ enters one input port of the seventh polarization beam splitter 4-3-13 and is transmitted from one output port thereof, and the polarization state thereof after passing through the first 45° polarization rotation structure 4-3-5 becomes:

$$E_{11}(t) = \frac{A(t)e^{(\omega t+\varphi_0)}}{2}\begin{bmatrix}\cos\theta_1\\ \cos\theta_2\end{bmatrix},$$

and then is polarization-split by the fifth polarization beam splitter 4-3-9 into two polarization components, which respectively enter the long arm and the short arm of the delay interference apparatus and both propagate along the slow axis of the polarization-maintaining optical fibers, wherein the phase of the component propagating along the short arm remains unchanged when passing through the second quarter-wave plate 4-3-12, the phase difference between the components propagating along the long arm and the short arm is 0. The two components perform a polarization combining-interference at the sixth polarization beam splitter 4-3-10, to generate the first polarization interference optical signal, the polarization state is:

$$E_{11out}(t) = \frac{e^{j(\omega t+\varphi_0)}\cos\theta_1}{2}\begin{bmatrix} A(t) \\ A(t-\tau)e^{-j\omega\tau} \end{bmatrix},$$

which after passing through the third 45° polarization rotation structure 4-3-7 becomes:

$$E_{11out}(t) = \frac{e^{j(\omega t+\varphi_0)}\cos\theta_1}{2\sqrt{2}}\begin{bmatrix} A(t) + A(t-\tau)e^{-j\omega\tau} \\ A(t) - j(t-\tau)e^{-j\omega\tau} \end{bmatrix}.$$

The horizontal polarization component of the first polarization interference optical signal is output from one input port of the eighth polarization beam splitter 4-3-14 and enters the third polarization beam splitter 4-4, while the vertical polarization component is output from the other input port of the eighth polarization beam splitter 4-3-14 and enters the fourth polarization beam splitter 4-5.

$E_{12}(t)$ enters one input port of the eighth polarization beam splitter 4-3-14 and is transmitted from one output port thereof, and the polarization state after passing through the third 45° polarization rotation structure 4-3-5 becomes:

$$E_{12}(t) = \frac{A(t)e^{(\omega t+\varphi_0)}}{2}\begin{bmatrix} \sin\theta_1 e^{j\delta_1} \\ \sin\theta_1 e^{j\delta_1} \end{bmatrix},$$

and then is polarization-split by the sixth polarization beam splitter 4-3-10 into two polarization components, which respectively enter the long arm and the short arm of the delay interference apparatus and both propagate along the slow axis of the polarization-maintaining optical fibers, wherein the phase of the component propagating along the short arm remains unchanged when passing through the second quarter-wave plate 4-3-12, and the phase difference between the components propagating along the long arm and the short arm is 0. The both perform a polarization combining-interference at the fifth polarization beam splitter 4-3-9, to generate the second polarization interference optical signal, the polarization state is:

$$E_{12out}(t) = \frac{e^{j(\omega t+\varphi_0)}\sin\theta_1 e^{j\delta_1}}{2}\begin{bmatrix} A(t) \\ A(t-\tau)e^{-j\omega\tau} \end{bmatrix},$$

which after passing through the first 45° polarization rotation structure 4-3-5 becomes:

$$E_{12out}(t) = \frac{e^{j(\omega t+\varphi_0)}\sin\theta_1 e^{j\delta_1}}{2\sqrt{2}}\begin{bmatrix} A(t) + A(t-\tau)e^{-j\omega\tau} \\ A(t) - A(t-\tau)e^{-j\omega\tau} \end{bmatrix}.$$

The horizontal polarization component of the second polarization interference optical signal is output from one input port of the seventh polarization beam splitter 4-3-13 and enters the third polarization beam splitter 4-4, while the vertical polarization component is output from the other input port of the seventh polarization beam splitter 4-3-13 and enters the fourth polarization beam splitter 4-5.

The horizontal polarization component of the first polarization interference optical signal $E_{11out}(t)$ and the horizontal polarization component of the second polarization interference optical signal $E_{12out}(t)$ are simultaneously output from one input port of the third polarization beam splitter 4-4 and combined to the first interference optical signal, the polarization state is:

$$E_{out1}(t) = \frac{e^{j(\omega t+\varphi_0)}}{2\sqrt{2}}[A(t) + A(t-\tau)e^{-j\omega\tau}]\begin{bmatrix} \sin\theta_1 e^{j\delta_1} \\ \cos\theta_1 \end{bmatrix}.$$

The vertical polarization component of the first polarization interference optical signal $E_{11out}(t)$ and the vertical polarization component of the second polarization interference optical signal $E_{12out}(t)$ are simultaneously output from one input port of the fourth polarization beam splitter 4-5 and combined to the second interference optical signal, the polarization state thereof is:

$$E_{out2}(t) = \frac{e^{j(\omega t+\varphi_0)}}{2\sqrt{2}}[A(t) - A(t-\tau)e^{-j\omega\tau}]\begin{bmatrix} \sin\theta_1 e^{j\delta_1} \\ \cos\theta_1 \end{bmatrix}.$$

The second interference optical signal directly enters one photoelectric detector of the first balanced detector 5, while the first interference optical signal enters the other photoelectric detector of the first balanced detector 5 after passing through the first circulator 2. The first differential current signal is generated after balanced detection, namely the in-phase component, which can be written as:

$$I_I(t) = R[|E_{out1}(t)|^2 - |E_{out2}(t)|^2] =$$
$$\frac{R}{2}|E(t)||E(t-\tau)|\cos(\omega\tau) = \frac{R}{2}A(t)A(t-\tau)\cos(\omega\tau).$$

R is the response efficiency of the photoelectric detector, and ω is the angular frequency of the signal light. It can be seen that the in-phase component based on self-interference of the signal output from the first balanced detector 5 is polarization-independent.

Before the second signal light component reaches the third polarization beam splitter 4-3 through the second circulator 3, the polarization state becomes:

$$E_2(t) = \frac{A(t)e^{j(\omega t+\varphi_0)}}{\sqrt{2}}\begin{bmatrix} \cos\theta_2 \\ \sin\theta_2 e^{j\delta_2} \end{bmatrix},$$

and then is polarization-split by the third polarization beam splitter 4-4 into a third polarization component $E_{21}(t)$ and a fourth polarization component $E_{22}(t)$, which both propagate along the fast axis of the polarization-maintaining optical fibers. $E_{21}(t)$ enters one input port of the seventh polarization beam splitter 4-3-13 and is transmitted from the other output port thereof, and the polarization state after passing through the second 45° polarization rotation structure 4-3-6 becomes:

$$E_{21}(t) = \frac{A(t)e^{j(\omega t+\varphi_0)}}{2}\begin{bmatrix}\cos\theta_2 \\ \cos\theta_2\end{bmatrix},$$

and then is polarization-split by the fifth polarization beam splitter 4-3-9 into two polarization components, which respectively enter the long arm and short arm of the delay interference apparatus and both propagate along the fast axis of the polarization-maintaining optical fibers, wherein the phase of the component propagating along the short arm increases by $\pi/2$ when passing through the second quarter-wave plate 4-3-12, and the phase difference of the components propagating along the long arm and the short arm is $\pi/2$. The two components perform a polarization combining-interference at the sixth polarization beam splitter 4-3-10, to generate the third polarization interference optical signal, the polarization state is:

$$E_{21out}(t) = \frac{e^{j(\omega t+\varphi_0)}\cos\theta_2}{2}\begin{bmatrix}A(t) \\ jA(t-\tau)e^{-j\omega\tau}\end{bmatrix},$$

which after passing through the fourth 45° polarization rotation structure 4-3-8 becomes:

$$E_{21out}(t) = \frac{e^{j(\omega t+\varphi_0)}\cos\theta_2}{2\sqrt{2}}\begin{bmatrix}A(t) + jA(t-\tau)e^{-j\omega\tau} \\ A(t) - jA(t-\tau)e^{-j\omega\tau}\end{bmatrix}.$$

The horizontal polarization component of the third polarization interference optical signal is output from one input port of the eighth polarization beam splitter 4-3-14 and enters the third polarization beam splitter 4-4, while the vertical polarization component is output from the other input port of the eighth polarization beam splitter 4-3-14 and enters the fourth polarization beam splitter 4-5.

$E_{22}(t)$ enters one input port of the eighth polarization beam splitter 4-3-14 and is transmitted from its other output port, and the polarization state thereof after passing through the fourth 45° polarization rotation structure 4-3-8 becomes:

$$E_{22}(t) = \frac{A(t)e^{j(\omega t+\varphi_0)}}{2}\begin{bmatrix}\sin\theta_2 e^{j\delta_2} \\ \sin\theta_2 e^{j\delta_2}\end{bmatrix},$$

and then is polarization-split by the sixth polarization beam splitter 4-3-10 into two polarization components, which respectively enter the long arm and the short arm of the delay interference apparatus and both propagate along the fast axis of the polarization-maintaining optical fiber, wherein the phase of the component propagating along the short arm increases by $\pi/2$ when passing through the second quarter-wave plate 4-3-12, and the phase difference of the components propagating along the long arm and the short arm is $\pi/2$. The two components perform a polarization combining-interference at the fifth polarization beam splitter 4-3-9, to generate the fourth polarization interference optical signal, the polarization state thereof is:

$$E_{22out}(t) = \frac{e^{j(\omega t+\varphi_0)}\sin\theta_2 e^{j\delta_2}}{2}\begin{bmatrix}A(t) \\ jA(t-\tau)e^{-j\omega\tau}\end{bmatrix},$$

which after passing through the second 45° polarization rotation structure 4-3-6 becomes:

$$E_{22out}(t) = \frac{e^{j(\omega t+\varphi_0)}\sin\theta_2 e^{j\delta_2}}{2\sqrt{2}}\begin{bmatrix}A(t) + jA(t-\tau)e^{-j\omega\tau} \\ A(t) - jA(t-\tau)e^{-j\omega\tau}\end{bmatrix}.$$

The horizontal polarization component of the fourth polarization interference optical signal is output from one input port of the seventh polarization beam splitter 4-3-13 and enters the third polarization beam splitter 4-4, while the vertical polarization component is output from the other input port of the seventh polarization beam splitter 4-3-13 and enters the fourth polarization beam splitter 4-5.

The horizontal polarization component of the third polarization interference optical signal $E_{21out}(t)$ and the horizontal polarization component of the fourth polarization interference optical signal $E_{22out}(t)$ are simultaneously output from the other input port of the third polarization beam splitter 4-4 and combined to the third interference optical signal, the polarization state thereof is:

$$E_{out3}(t) = \frac{e^{j(\omega t+\varphi_0)}}{2\sqrt{2}}[A(t) + jA(t-\tau)e^{-j\omega\tau}]\begin{bmatrix}\sin\theta_2 e^{j\delta_2} \\ \cos\theta_2\end{bmatrix}.$$

The vertical polarization component of the third polarization interference optical signal $E_{21out}(t)$ and the vertical polarization component of the fourth polarization interference optical signal $E_{22out}(t)$ are simultaneously output from the other input port of the fourth polarization beam splitter 4-5 and combined to the fourth interference optical signal, the polarization state is:

$$E_{out4}(t) = \frac{e^{j(\omega t+\varphi_0)}}{2\sqrt{2}}[A(t) - jA(t-\tau)e^{-j\omega\tau}]\begin{bmatrix}\sin\theta_2 e^{j\delta_2} \\ \cos\theta_2\end{bmatrix}.$$

The fourth interference optical signal directly enters one photoelectric detector of the second balanced detector 6, while the third interference optical signal enters the other photoelectric detector of the second balanced detector 6 after passing through the second circulator 3. The second differential current signal is generated after balanced detection, namely the quadrature component, which can be written as:

$$I_Q(t) = R[|E_{out3}(t)|^2 - |E_{out4}(t)|^2] = \frac{R}{2}|E(t)||E(t-\tau)|\sin(\omega\tau) = \frac{R}{2}A(t)A(t-\tau)\sin(\omega\tau).$$

It can be seen that the quadrature component based on self-interference of the signal output from the second balanced detector 6 is polarization-independent.

Finally, the electrical signal processing module 7 synthesizes the in-phase component and the quadrature component of an electrical signal into a complex signal, which can be written as:

$$u(t) = I_I(t) + jI_Q(t) = \frac{R}{2}E(t)E^*(t-\tau).$$

The above complex signal is sampled and digitally processed by the electrical signal processing module 7, to restore the electric field information of the signal light, so as to obtain service data.

Based on various embodiments of the present disclosure, it can be seen that the present disclosure proposes a self-coherent receiver based on single delay interferometer, which can realize delayed self-coherence independent of the signal light polarization without using a polarization controller to actively calibrate the signal light polarization, thereby eliminating influence of the random polarization state change of the signal light on the receiver, which improves the stability of the receiver. Moreover, only a single delay interferometer and two sets of balanced detectors are required by the receiver, which reduces the difficulty and complexity of electronic signal processing after balanced detection, thus greatly reducing the complexity of the receiving terminal. At the same time, the present disclosure can be applied not only to optical communication systems, but also to continuous variable quantum key distribution systems and sensor systems, thereby having high versatility and practicability.

What is claimed is:

1. A self-coherent receiver based on single delay interferometer, comprising: a first beam splitter, a first circulator, a second circulator, a double path bidirectional multiplexing delay interferometer, a first balanced detector, a second balanced detector and an electrical signal processing module, wherein, two output ports of the first beam splitter are respectively connected to a first port of the first circulator and a first port of the second circulator; a second port of the first circulator and a second port of the second circulator are respectively connected to two input ports of the double path bidirectional multiplexing delay interferometer; two output ports of the double path bidirectional multiplexing delay interferometer are respectively connected to one photoelectric detector of the first balanced detector and one photoelectric detector of the second balanced detector; a third port of the first circulator and a third port of the second circulator are respectively connected to a second photoelectric detector of the first balanced detector and a second photoelectric detector of the second balanced detector; a differential current output port of the first balanced detector and a differential current output port of the second balanced detector are respectively connected to the electrical signal processing module;

the first beam splitter is configured to split a received signal light, to generate a first signal light component and a second signal light component;

the first circulator is configured to transmit the first signal light component to one of the two input ports of the double path bidirectional multiplexing delay interferometer; the second circulator is configured to transmit the second signal light component to a second one of the two input ports of the double path bidirectional multiplexing delay interferometer;

the double path bidirectional multiplexing delay interferometer has a long arm and a short arm for performing a polarization-independent delayed self-interference on the first signal light component to generate a first interference optical signal and a second interference optical signal, wherein the first interference optical signal and the second interference optical signal are respectively output from one of the two input ports and one of the two output ports of the double path bidirectional multiplexing delay interferometer; and for performing a polarization-independent delayed self-interference on the second signal light component to generate a third interference optical signal and a fourth interference optical signal, wherein the third interference optical signal and the fourth interference optical signal are respectively output from a second one of the two input ports and a second one of the two output ports of the double path bidirectional multiplexing delay interferometer;

a phase difference between components of the first signal light component on the long arm and the short arm of the double path bidirectional multiplexing delay interferometer is 0, and a phase difference between components of the second signal light component on the long arm and the short arm of the double path bidirectional multiplexing delay interferometer is π/2;

the first circulator is further configured to transmit the first interference optical signal to the first balanced detector; the second circulator is further configured to transmit the third interference optical signal to the second balanced detector;

the first balanced detector is configured to perform a balanced detection on the first interference optical signal and the second interference optical signal, to generate a first differential current signal; the second balanced detector is configured to perform a balanced detection on the third interference optical signal and the fourth interference optical signal, to generate a second differential current signal; and the electrical signal processing module is configured to receive the first differential current signal and the second differential current signal, sample and process the first differential current signal and the second differential current signal to restore service data.

2. The self-coherent receiver based on single delay interferometer according to claim 1, wherein the double path bidirectional multiplexing delay interferometer comprises a first polarization beam splitter, a second polarization beam splitter and a delay interference apparatus;

one input port of the first polarization beam splitter is connected to the second port of the first circulator, and a second input port of the first polarization beam splitter is configured as one of the two output ports of the double path bidirectional multiplexing delay interferometer;

two output ports of the first polarization beam splitter are respectively connected to one input port and one output port of the delay interference apparatus through a polarization-maintaining optical fiber;

one input port of the second polarization beam splitter is connected to the second port of the second circulator, and a second input port of the second polarization beam splitter is configured as a second of the two output ports of the double path bidirectional multiplexing delay interferometer; and two output ports of the second polarization beam splitter are respectively connected to a second input port and a second output port of the delay interference apparatus through the polarization-maintaining optical fiber.

3. The self-coherent receiver based on single delay interferometer according to claim 1, wherein the double path bidirectional multiplexing delay interferometer comprises a third polarization beam splitter, a fourth polarization beam splitter and a delay interference apparatus;
  two input ports of the third polarization beam splitter are respectively connected to the second port of the first circulator and the second port of the second circulator through a polarization-maintaining optical fiber, and two output ports of the third polarization beam splitter are respectively connected to one input port and one output port of the delay interference apparatus;
  two input ports of the fourth polarization beam splitter are respectively connected to a second input port and a second output port of the delay interference apparatus through polarization-maintaining optical fibers, and two output ports of the fourth polarization beam splitter are respectively configured as the two output ports of the double path bidirectional multiplexing delay interferometer.

4. The self-coherent receiver based on single delay interferometer according to claim 2, wherein the delay interference apparatus comprises a second beam splitter, a third beam splitter, a first delay line and a first quarter-wave plate;
  an interior of the delay interference apparatus is filled only with the polarization-maintaining optical fiber;
  an angle between a main axis of the first quarter-wave plate and a slow axis of the polarization-maintaining optical fiber is 0°;
  one output port of the second beam splitter is connected to one output port of the third beam splitter through the first delay line to constitute a long arm of the delay interference apparatus; a second output port of the second beam splitter is connected to a second output port of the third beam splitter through the first quarter-wave plate to constitute a short arm of the delay interference apparatus;
  two input ports of the second beam splitter are configured as two input ports of the delay interference apparatus respectively;
  two input ports of the third beam splitter are configured as the output port and the second output port of the delay interference apparatus respectively.

5. The self-coherent receiver based on single delay interferometer according to claim 3, wherein the delay interference apparatus comprises a second beam splitter, a third beam splitter, a first delay line and a first quarter-wave plate;
  an interior of the delay interference apparatus is filled only with the polarization-maintaining optical fiber;
  an angle between a main axis of the first quarter-wave plate and a slow axis of the polarization-maintaining optical fiber is 0°;
  one output port of the second beam splitter is connected to one output port of the third beam splitter through the first delay line to constitute a long arm of the delay interference apparatus; a second output port of the second beam splitter is connected to a second output port of the third beam splitter through the first quarter-wave plate to constitute a short arm of the delay interference apparatus;
  two input ports of the second beam splitter are configured as two input ports of the delay interference apparatus respectively;
  two input ports of the third beam splitter are configured as the output port and the second output port of the delay interference apparatus respectively.

6. The self-coherent receiver based on single delay interferometer according to claim 2, wherein the delay interference apparatus comprises a first 45° polarization rotation structure, a second 45° polarization rotation structure, a third 45° polarization rotation structure, a fourth 45° polarization rotation structure, a fifth polarization beam splitter, a sixth polarization beam splitter, a second delay line and a second quarter-wave plate;
  an interior of the delay interference apparatus is filled only with the polarization-maintaining optical fiber;
  an angle between a main axis of the second quarter-wave plate and a slow axis of the polarization-maintaining optical fiber is 0°;
  one output port of the fifth polarization beam splitter is connected to one output port of the sixth polarization beam splitter through the second delay line to constitute a long arm of the delay interference apparatus;
  a second output port of the fifth polarization beam splitter is connected to a second output port of the sixth polarization beam splitter through the second quarter-wave plate to constitute a short arm of the delay interference apparatus;
  two input ports of the fifth polarization beam splitter are configured as two input ports of the delay interference apparatus respectively;
  two input ports of the sixth polarization beam splitter are configured as the output port and the second output port of the delay interference apparatus respectively;
  the first 45° polarization rotation structure, the second 45° polarization rotation structure, the third 45° polarization rotation structure, and the fourth 45° polarization rotation structure are correspondingly provided on optical fiber at the two input ports of the delay interference apparatus and the output port and the second output port of the delay interference apparatus.

7. The self-coherent receiver based on single delay interferometer according to claim 3, wherein the delay interference apparatus comprises a first 45° polarization rotation structure, a second 45° polarization rotation structure, a third 45° polarization rotation structure, a fourth 45° polarization rotation structure, a fifth polarization beam splitter, a sixth polarization beam splitter, a second delay line, a second quarter-wave plate, a seventh polarization beam splitter and an eighth polarization beam splitter;
  an interior of the delay interference apparatus is filled only with the polarization-maintaining optical fiber;
  an angle between a main axis of the second quarter-wave plate and a slow axis of the polarization-maintaining optical fiber is 0°;
  one output port of the fifth polarization beam splitter is connected to one output port of the sixth polarization beam splitter through the second delay line to constitute a long arm of the delay interference apparatus;
  a second output port of the fifth polarization beam splitter is connected to a second output port of the sixth polarization beam splitter through the second quarter-wave plate to constitute a short arm of the delay interference apparatus;
  two output ports of the seventh polarization beam splitter are respectively connected to two input ports of the fifth polarization beam splitter through the first 45° polarization rotation structure and the second 45° polarization rotation structure;

two output ports of the eighth polarization beam splitter are respectively connected to two input ports of the sixth polarization beam splitter through the third 45° polarization rotation structure and the fourth 45° polarization rotation structure;

two input ports of the seventh polarization beam splitter are respectively configured as two input ports of the delay interference apparatus;

two input ports of the eighth polarization beam splitter are respectively configured as the output port and the second output port of the delay interference apparatus.

8. The self-coherent receiver based on single delay interferometer according to claim 6, wherein the first 45° polarization rotation structure, the second 45° polarization rotation structure, the third 45° polarization rotation structure, the fourth 45° polarization rotation structure are all half-wave plates, and an angle between a main axis direction of the half-wave plates and a horizontal direction is 22.5°.

9. The self-coherent receiver based on single delay interferometer according to claim 7, wherein the first 45° polarization rotation structure, the second 45° polarization rotation structure, the third 45° polarization rotation structure, the fourth 45° polarization rotation structure are all half-wave plates, an angle between a main axis direction of the half-wave plates and a horizontal direction is 22.5°.

* * * * *